Figure 1:
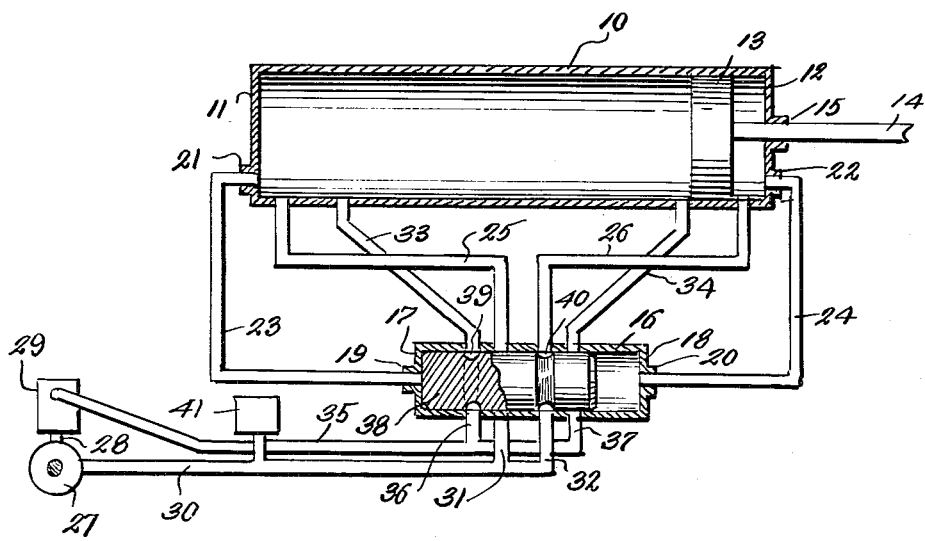

May 15, 1956 J. M. WILDEMAN 2,745,386
HYDRAULIC MOTOR AND AUTOMATIC VALVE THEREFOR
Filed May 27, 1953 2 Sheets-Sheet 1

INVENTOR.
JULIUS M. WILDEMAN
BY Patrick D. Beavers
ATTORNEY

May 15, 1956  J. M. WILDEMAN  2,745,386
HYDRAULIC MOTOR AND AUTOMATIC VALVE THEREFOR
Filed May 27, 1953  2 Sheets-Sheet 2
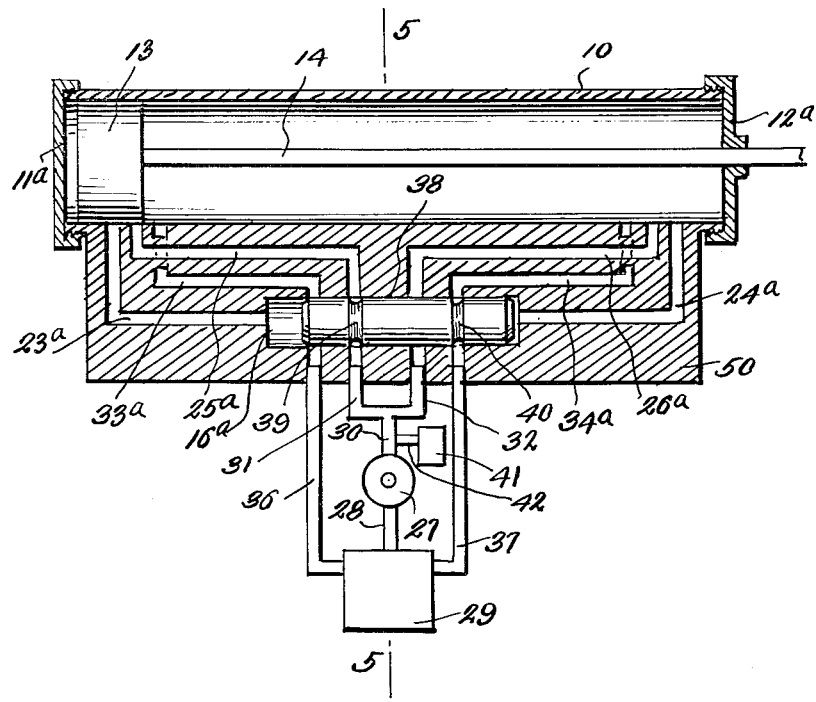
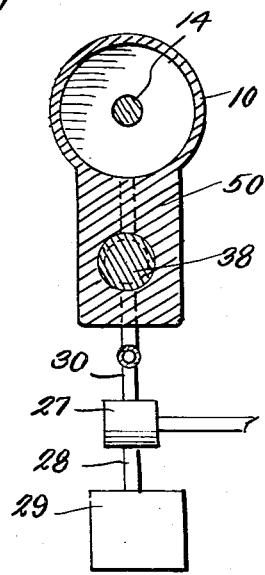
INVENTOR.
JULIUS M. WILDEMAN
BY Patrick D. Beavers
ATTORNEY

United States Patent Office 2,745,386
Patented May 15, 1956

2,745,386

HYDRAULIC MOTOR AND AUTOMATIC VALVE THEREFOR

Julius M. Wildeman, Park, Kans.

Application March 27, 1953, Serial No. 345,061

1 Claim. (Cl. 121—150)

The present invention relates to an hydraulic motor and automatic valve therefor and it consists in the combinations, constructions and arrangements of parts herein described and claimed.

Generally there is provided a reciprocating motor adapted to be hydraulically operated and which is provided with a novel automatically controlled hydraulically operated valve. The device is particularly adaptable for use with mechanisms depending upon reciprocating motion for their actuation such as, for example, a sickle bar or the like.

It is accordingly an object of the invention to provide a novel hydraulic motor provided with novel hydraulic control means therefor.

Another object of the invention is the provision, in a device of the character set forth, of a novel control valve forming a part of the invention.

A further object of the invention is to provide a device of the character set forth which is simple in construction, inexpensive to manufacture and yet effective and efficient in use.

Figure 2:
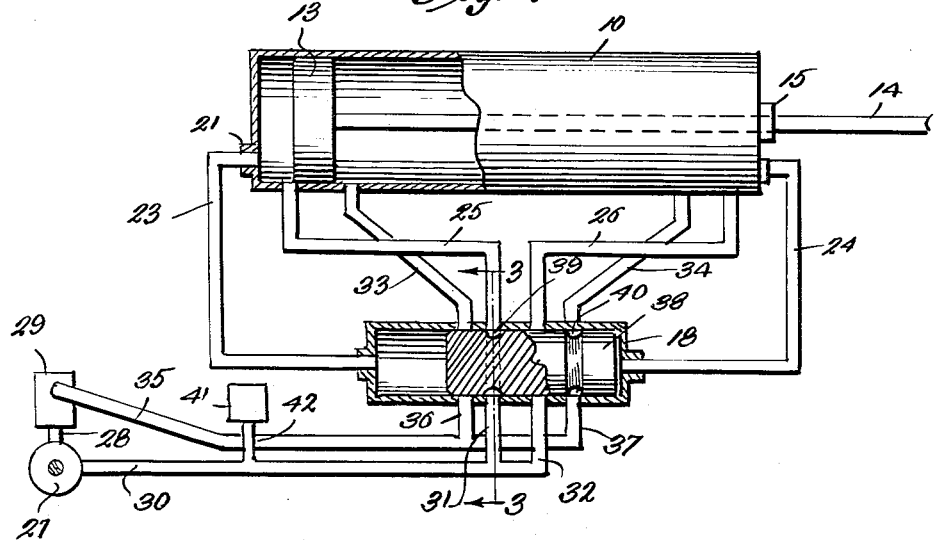
Figure 3:
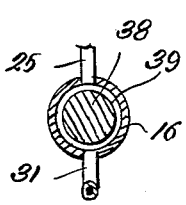

Other and further objects of the invention will become apparent from a reading of the following specification taken in conjunction with the drawing, in which:

Figure 1 is an elevational view, partly broken away, of an embodiment of the invention showing a valve forming a part of the invention in one of its positions, Figure 2 is a view similar to Figure 1 but showing the mechanism moved to another position it may take in the course of its operation, Figure 3 is a sectional view taken along line 3—3 of Figure 2, Figure 4 is a view similar to Figures 1 and 2 but showing a modified form the invention may assume, and Figure 5 is a sectional view taken along line 5—5 of Figure 4.

Referring more particularly to the drawings, there is shown therein a device of the character set forth comprising a motor cylinder 10 having closed ends 11 and 12. A motor piston 13 is reciprocally mounted in the cylinder 10 and is provided with a shaft 14 which extends through a bearing 15 mounted centrally in the end 12 of the cylinder 10, it being understood that the shaft 14 may be connected with a device to be moved thereby such as, for example, a sickle.

A valve cylinder 16 is provided with closed ends 17 and 18 each of which ends is centrally and respectively provided with a fitting 19 and 20. The ends 11 and 12 of the cylinder are provided with fittings 21 and 22, respectively. A control pipe 23 interconnects the fittings 19 and 21 while a control pipe 24 interconnects the fittings 20 and 22.

A supply pipe 25 interconnects the central portion of the cylinder 16 with one end portion of the cylinder 10 while a like supply pipe 26 interconnects the central portion of the cylinder 16 with the other end portion of the cylinder 10. A pump 27 is connected by an intake pipe 28 with a reservoir 29 and is also provided with an outlet pipe 30 which is, in turn, connected to two branch pipes 31 and 32 which connect with the cylinder 16 immediately below the lower ends of the pipes 25 and 26, respectively.

A return pipe 33 connects with the cylinder 10 at one end inwardly in spaced relation to the connection of the pipe 25 therewith and at its other end connects with the cylinder 16 in outwardly spaced relation to the connection of the pipe 25 therewith. A return pipe 34 is connected to the cylinder 10 in inwardly spaced relation to the connection of the pipe 26 therewith and in outwardly spaced relation, at its other end, to the cylinder 16 with respect to the other end of the pipe 26. A pipe 35 is connected at one of its ends to the reservoir 29 and at its other end portion to a pair of branch pipes 36 and 37 which connect with the cylinder 16 immediately below the lower ends of the pipes 33 and 34, respectively. An elongated valve piston 38 is reciprocally mounted in the piston 16 and is provided with a pair of circumferential grooves 39 and 40 which are so spaced from each other as to register selectively with the lower terminals of the pipes 33 and 26, respectively, or with the lower terminals of the pipes 25 and 34, respectively. A hydraulically operated solenoid control valve 41 is connected by a pipe 42 with the pipe 30 and forms a safety means whereby the pump is shut off in the event of too great pressure building up in pipe 30 should the piston 38 fail to function for any reason.

In the operation of this form of the invention, it will be apparent that with the device shown in its condition illustrated in Figure 1 where the piston 38 is at its extreme left hand position that when the pump 27 is operating it will supply fluid through the pipe 30 and thence through the branch pipe 32 through the groove 40 which is registering therewith at this time and thence through the pipe 26 to the right hand side of the cylinder 10. This action will cause the piston 13 to move to the left and consequently move the shaft 14 likewise to the left. During this action fluid will be forced through the return line 33 thence through the groove 39 which will be in registry therewith and thence through the branch 36 to the pipe 35 back to the reservoir 29. When the piston 13 comes into registry with the upper end of the pipe 33 it will act to close the same and the remainder of the fluid in the cylinder 10 will then be forced through the pipe 23 to thus move the piston 38 to the right to the position shown, for example, in Figure 2. This action will bring the grooves 39 and 40 into registry with pipe 25 and branch pipe 31 in the one case and with pipe 26 and branch 32 in the other case, respectively, thus allowing a flow of fluid from the pump 27 through the pipe 30 into the branch 31, thence through the groove 39 to the pipe 25 to thus cause the piston 13 to now move to the right carrying the shaft 14 with it. As this action occurs, fluid in the cylinder 10 upon the right hand side of the piston 13 will be forced through the return line 34, the groove 40, the branch 37 and pipe 35 back to the reservoir 29. It will be apparent that this action above described will be continuous so long as the pump 27 is operated.

Referring now to Figures 4 and 5, it will be apparent that mechanically the device therein shown is identical with that described with regard to Figures 1 to 3, inclusive, with the exception that the end walls 11 and 12 are replaced by removable caps 11a and 12a and that a block 50 is formed integrally with one side of the cylinder 10 and is provided with internal passageways 23a, 33a, 25a, 34a, 26a and 24a which replace the pipes 23, 33, 25, 34, 26 and 24, respectively. It will also be seen that the cylinder 16 is replaced by a cylinder 16a formed interiorly in the block 50. The piston 16a is connected with the pump 27 and reservoir 29 as heretofore described with regard to Figures 1 and 2 and the operation of this form of the invention is identical with that heretofore described with regard to the device shown in Figures 1 and 2 with the exception that a lesser amount of piping is exposed in this form of the invention making it a more compact mechanism.

While but two forms of the invention have been shown and described herein, it will be readily apparent to those skilled in the art that many minor modifications may be made without departing from the spirit of the invention or the scope of the appended claim.

What is claimed is:

A device of the character described comprising a valve housing, a valve in said housing, a first pair of supply pipes connected to said valve housing, a first pair of return pipes connected to said valve housing, a motor cylinder, a piston reciprocally mounted in said motor cylinder, a shaft extending from said piston through one end of said cylinder, a control pipe interconnecting each end of said valve housing with an end of said cylinder, a second pair of supply pipes each connecting a central portion of said valve housing with said cylinder adjacent one end thereof, and a second pair of return pipes each connecting said valve housing outwardly of said central portion with an end portion of said cylinder inwardly of said second supply pipe connections therewith, said valve adapted to be moved alternately in opposite directions by fluid moving through said control pipes from said cylinder, and said valve adapted to control the direction of flow of fluid to and from said cylinder, said valve housing being cylindrical, said valve being a cylinder provided with a pair of spaced annular grooves, and said grooves being adapted to selectively interconnect said first and second pairs of supply and return pipes.

References Cited in the file of this patent
UNITED STATES PATENTS

| | | |
|---|---|---|
| 275,746 | Angus | Apr. 10, 1883 |
| 547,623 | Bartholomew | Oct. 8, 1895 |
| 598,949 | Moore | Feb. 15, 1898 |
| 655,737 | Rhodes | Aug. 14, 1900 |
| 864,662 | Lundquist | Aug. 27, 1907 |
| 1,495,333 | Kruger | May 27, 1924 |
| 1,690,484 | Gartin | Nov. 6, 1928 |
| 2,036,631 | Helenberg | Apr. 7, 1936 |
| 2,298,457 | Berges | Oct. 13, 1942 |
| 2,380,315 | Kilian | July 10, 1945 |
| 2,550,723 | Ross | May 1, 1951 |